(12) United States Patent
Vashdi et al.

(10) Patent No.: US 9,352,765 B2
(45) Date of Patent: May 31, 2016

(54) DEVICE FOR AUTOMATICALLY ROCKING A STROLLER

(71) Applicants: Yehiel Vashdi, Bat Yam (IL); Shai Kahalani, Bat Yam (IL)

(72) Inventors: Yehiel Vashdi, Bat Yam (IL); Shai Kahalani, Bat Yam (IL)

( * ) Notice: Subject to any disclaimer, the term of this patent is extended or adjusted under 35 U.S.C. 154(b) by 0 days.

(21) Appl. No.: 14/413,176

(22) PCT Filed: May 26, 2013

(86) PCT No.: PCT/IL2013/050450
§ 371 (c)(1),
(2) Date: Jan. 6, 2015

(87) PCT Pub. No.: WO2014/013482
PCT Pub. Date: Jan. 23, 2014

(65) Prior Publication Data
US 2015/0197271 A1    Jul. 16, 2015

(30) Foreign Application Priority Data
Jul. 16, 2012    (IL) .......................................... 220980

(51) Int. Cl.
| | | |
|---|---|---|
| *B60T 7/12* | (2006.01) | |
| *B62B 9/22* | (2006.01) | |
| *B60T 7/14* | (2006.01) | |
| *B62B 5/04* | (2006.01) | |

(Continued)

(52) U.S. Cl.
CPC ... *B62B 9/22* (2013.01); *B60K 1/00* (2013.01); *B60K 1/04* (2013.01); *B60T 7/12* (2013.01); *B60T 7/14* (2013.01); *B62B 5/0046* (2013.01); *B62B 5/04* (2013.01); *B62B 5/0414* (2013.01); *B62B 2005/0471* (2013.01)

(58) Field of Classification Search
None
See application file for complete search history.

(56) References Cited

U.S. PATENT DOCUMENTS 4,629,950 A * 12/1986 Ching ............................ 318/285
4,837,876 A *  6/1989 Levy ................................. 5/107

(Continued)

FOREIGN PATENT DOCUMENTS

| CN | 201703414 U | 1/2011 |
|---|---|---|
| CN | 102198839 A | 9/2011 |

(Continued)

OTHER PUBLICATIONS

"International Application Serial No. PCT/IL2013/050450, International Search Report mailed Sep. 2, 2013", 3 pgs.

(Continued)

*Primary Examiner* — Brodie Follman
*Assistant Examiner* — Hilary L Johns
(74) *Attorney, Agent, or Firm* — Schwegman, Lundberg & Woessner, P.A.

(57) ABSTRACT

The present invention relates to a device for automatically rocking a stroller, comprising: a) an electronic unit for operating the device by providing commands to move said stroller in a forward and/or a backward direction; b) a motion wheel adapted to rotate the wheel of the stroller by friction; c) a rotor mechanically connected to said motion wheel for rotating said motion wheel according to commands received from said electronic unit; d) a control wheel that includes a wheel portion adapted to be connected to the wheel of said stroller and a corresponding sensor board adapted to sense the rotational movement of said wheel portion and accordingly to provide to said electronic unit information regarding the actual rotational movement of said stroller's wheel; and e) a power source for powering said electronic unit.

7 Claims, 10 Drawing Sheets

(51) Int. Cl.
    *B62B 5/00*      (2006.01)
    *B60K 1/04*      (2006.01)
    *B60K 1/00*      (2006.01)

(56)              References Cited

U.S. PATENT DOCUMENTS

| | | | | |
|---|---|---|---|---|
| 4,856,130 | A  * | 8/1989  | Berkovich       | 5/109 |
| 5,249,640 | A  * | 10/1993 | Grove           | 180/166 |
| 5,370,572 | A  * | 12/1994 | Lee             | 446/462 |
| 5,572,903 | A  * | 11/1996 | Lee             | 74/44 |
| 5,873,425 | A  * | 2/1999  | Yang            | 180/65.6 |
| 5,937,961 | A  * | 8/1999  | Davidson        | 180/166 |
| 6,360,836 | B1 * | 3/2002  | Milano et al.   | 180/65.6 |
| 6,519,792 | B2 * | 2/2003  | Chen            | 5/109 |
| 6,588,527 | B2 * | 7/2003  | Lerner et al.   | 180/166 |
| 7,077,405 | B2 * | 7/2006  | Akpom           | 280/47.38 |
| 7,077,423 | B2 * | 7/2006  | Hutchinson      | 280/649 |
| 7,198,122 | B1 * | 4/2007  | Smith           | 180/12 |
| 7,703,848 | B1 * | 4/2010  | Cochran et al.  | 297/256.16 |
| 7,726,683 | B2 * | 6/2010  | Moriguchi et al.| 280/642 |
| 7,971,885 | B2 * | 7/2011  | Sanders et al.  | 280/47.1 |
| 7,987,933 | B1 * | 8/2011  | McClellan et al.| 180/65.1 |
| 8,020,944 | B2 * | 9/2011  | Thompson        | 301/5.1 |
| 9,027,689 | B1 * | 5/2015  | Brien et al.    | 180/166 |
| 2006/0131840 | A1 * | 6/2006 | Donay        | 280/642 |
| 2007/0051566 | A1 * | 3/2007 | Marlow        | 188/20 |
| 2007/0085286 | A1 * | 4/2007 | Gibree        | 280/47.38 |
| 2007/0108710 | A1 * | 5/2007 | Pennisi et al.| 280/47.38 |
| 2008/0048482 | A1 * | 2/2008 | Chen et al.   | 297/467 |

FOREIGN PATENT DOCUMENTS

| | | |
|---|---|---|
| CN | 101898579 B       | 11/2012 |
| DE | 29914978 U1       | 12/1999 |
| DE | 10300391 A1       | 7/2005 |
| DE | 102004001015 A1   | 10/2005 |
| FR | 2651980 A1        | 3/1991 |

OTHER PUBLICATIONS

Chinese Application Serial No. 201380037606.6, Office Action mailed Mar. 4, 2016, in English, 9 pgs.
European Application Serial No. 13819905.4, Extended European Search Report mailed Feb. 29, 2016, 6 pgs.

* cited by examiner

Start/Stop switch: start and stop the motor.

Mode switch: Range, time (and speed Optional).

"+": Increase mode parameter.

"-": Decrease mode parameter.

DEVICE FOR AUTOMATICALLY ROCKING A STROLLER

PRIORITY APPLICATIONS

This application is a U.S. National Stage Filing under 35 U.S.C. 371 from International Application No. PCT/IL2013/050450, filed on 26 May 2013, and published as WO 2014/013482 on 23 Jan. 2014, which claims the benefit under 35 U.S.C. 119 to Israeli Application No. 220980, filed on 16 Jul. 2012; which applications and publication are incorporated herein by reference in their entirety.

FIELD OF THE INVENTION

The present invention relates to the field of baby strollers. More particularly, the invention relates to a device that can automatically rock a stroller.

BACKGROUND OF THE INVENTION

During the first months of a baby life, a baby stroller is one of the places the baby may spend most of his time. The baby-stroller can be used for a variety of common tasks, such as shopping, walking in the park, and as a basic tool to transfer the baby from one place to another in a safety and a pleasant manner.

In addition the baby-stroller is also used as a resting and a sleeping place for the baby. The need for putting the occupant of a stroller (i.e., a baby or a toddler) to sleep is well known. It is well known that babies have a better sleep through motion, as rocking the baby in a stroller has a calming effect on the baby. In another words, the baby-stroller is a kind of a second home for the baby. However, this simple action of rocking the stroller (i.e., moving the stroller forward and backward) neutralizes or limits the parent (or other person who take care of the baby) of doing other tasks.

Chinese Patent application No. 102198839 discloses a trolley capable of reciprocating to calm baby, which comprises a trolley frame and a reciprocating driving device. Wheels of the trolley are driven by a linking device, so the trolley can move in a reciprocated manner without being pushed by people in a short distance to calm the baby on the trolley. The reciprocating time, distance and/or frequencies of the trolley can be preset according to the reciprocating driving device; and the moving direction of the trolley can be changed and the set for calming the baby is executed by detecting the revolution number of a driving motor inside the trolley.

However, such reciprocating driving device is lack the ability to accurately "know" the distance the trolley passes through as the measurements are not taken directly from the trolley's wheel. Moreover, such reciprocating driving device is lack the ability to "know" whether the stroller actually moves and how it actually moves, as it depends only on the driving motor with no feedback from the stroller's wheel. For example, if a malfunction occurs such that the driving motor moves the stroller only in one direction (as in one direction there is a limited friction or no friction at all between the device and the stroller's wheel), the stroller will be advanced in one direction only (which might be very dangerous in some environments), but the device will be unaware of such malfunction situation.

Therefore, it is an object of the present invention to provide a device which is capable of accurately measuring the actual distance of the trolley in any direction.

It is another object of the present invention to provide a device that is capable of "knowing" whether the stroller actually moves and how much it actually moves in each direction.

It is still another object of the present invention to provide a device which is capable of replacing the manual action of moving the baby stroller forward and backward.

It is yet another object of the present invention to provide a device which is capable of allowing the baby's guardian to do other tasks while the baby is resting or taking a nap.

Other objects and advantages of the invention will become apparent as the description proceeds.

SUMMARY OF THE INVENTION

The present invention relates to a device for automatically rocking a stroller, comprising: a) an electronic unit for operating the device by providing commands to move said stroller in a forward and/or a backward direction; b) a motion wheel adapted to rotate the wheel of the stroller by friction; c) a rotor mechanically connected to said motion wheel for rotating said motion wheel according to commands received from said electronic unit; d) a control wheel that includes a wheel portion adapted to be connected to the wheel of said stroller and a corresponding sensor board adapted to sense the rotational movement of said wheel portion and accordingly to provide to said electronic unit information regarding the actual rotational movement of said stroller's wheel; and e) a power source for powering said electronic unit.

According to an embodiment of the invention, the device further comprises a control panel for controlling the electronic unit via a communication channel. The control panel can be an electronic module dedicated and configured to work with the electronic unit, a smart-phone capable of running an application for easily interacting with the electronic unit, or any other electronic module capable of controlling and communicating with the electronic unit.

According to an embodiment of the invention, the communication channel is either a wired communication link (e.g., a USB cable) or a wireless communication link (e.g., Bluetooth, Zigbee, WiFi).

According to an embodiment of the invention, the electronic unit includes a micro controller and a driver. The driver is an electronic module for activating the rotor according to predefined program codes or according to user's setting via the control panel.

According to an embodiment of the invention, the electronic unit further includes a charging circuitry for charging the power source.

According to an embodiment of the invention, the control wheel allows the electronic unit to measure the distance the stroller traveled in each direction (i.e., forward and/or backward) and accordingly to limit the travelling distance in each direction.

DETAILED DESCRIPTION OF THE INVENTION

The device of the present invention can be applied to any vehicle in which rocking is necessary, including but not limited to baby strollers, wheelchairs or other vehicles as to whom rocking has a calming effect. Since the most common application is for strollers carrying a child, the preferred embodiment is described in terms of strollers. Accordingly, although the device is illustrated in terms of a stroller, the present invention contemplates that device may be applied to any suitable vehicle. Consequently, the term "stroller" as used herein, refers to both strollers, carriages, wheelchairs and other vehicles adapted for an individual to sit or to lie in and be moved using wheels. This term does not imply any particular shape, construction material or geometry, and invention is applicable to all suitable strollers. Moreover, the present invention can be applied to any vehicle in which an essentially accurate distance measuring is required.

Reference will now be made to several embodiments of the present invention(s), examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The terms, "for example", "e.g.", "optionally", as used herein, are intended to be used to introduce non-limiting examples. While certain references are made to certain example system components, other components can be used as well and/or the example components can be combined into fewer components and/or divided into further components.

Figure 1:
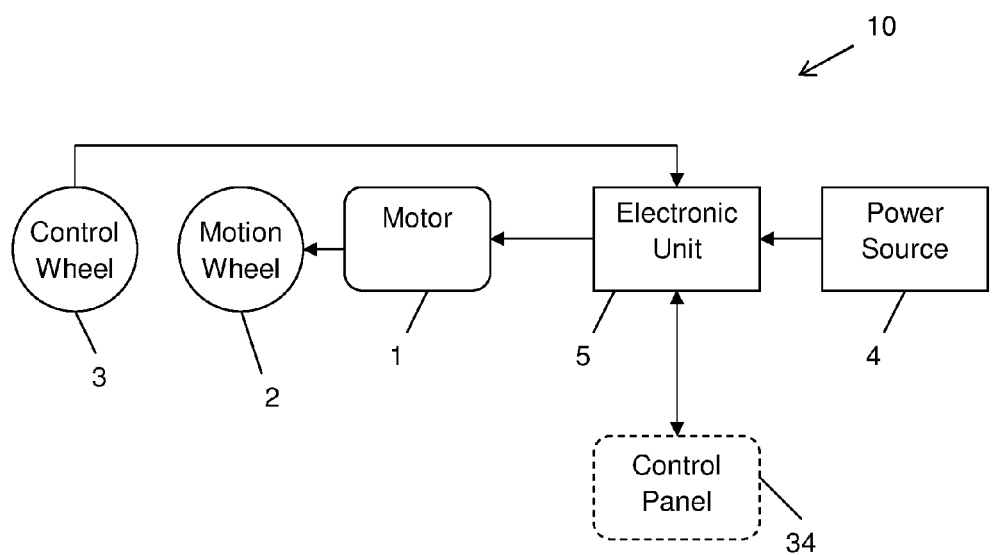
FIG. 1 is a general flow chart of the operating method of the invention.

FIG. 1 schematically illustrates, in a block diagram form, the operating method of a device for automatically rocking a stroller, according to an embodiment of the present invention. The device generally indicated by numeral 10 in the figure comprises a motor 1 (e.g., a DC motor), a motion wheel 2, a control wheel 3, a power source 4, and an Electronic Unit (EU) 5. In this figure, an optional control panel 34 is also shown. The control panel 34 allows a user to interact and control the operation of device 10, as will be described in further details hereinafter.

Figure 2:
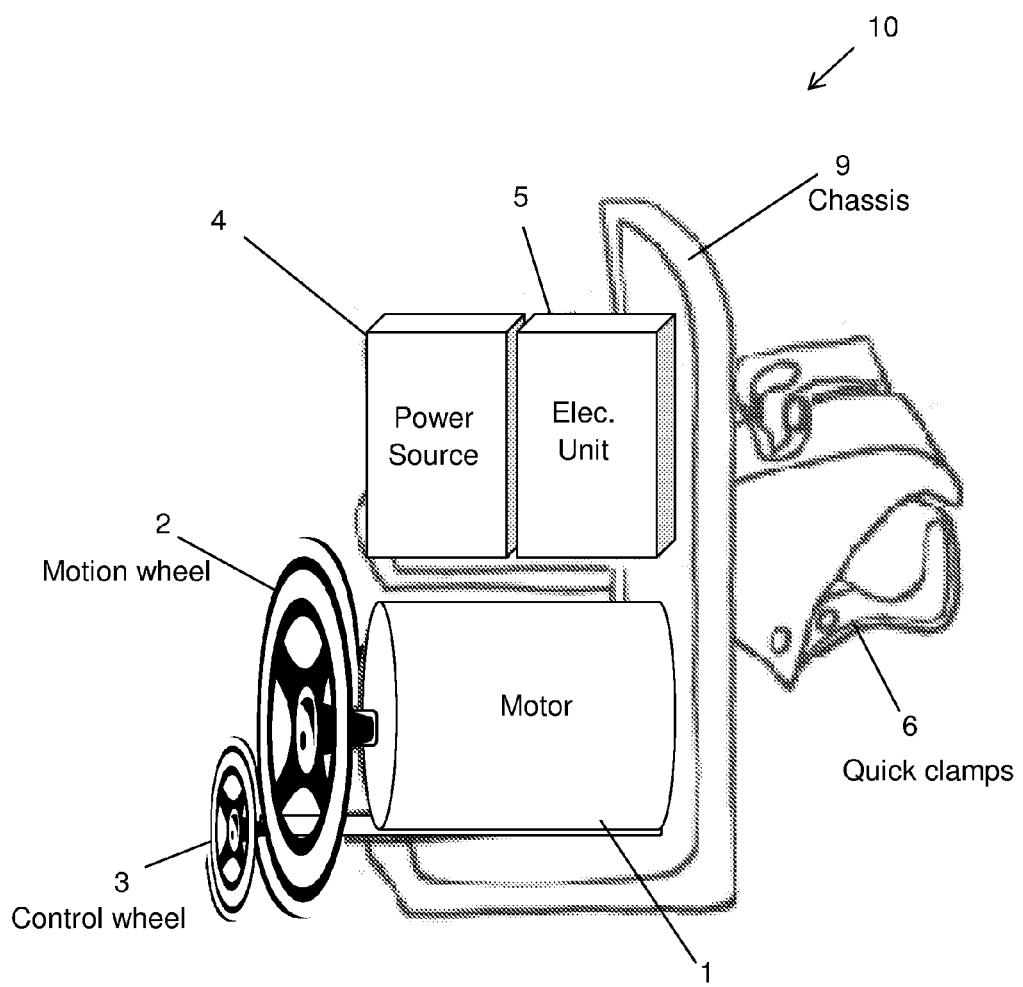
FIG. 2 is a perspective view generally illustrating an embodiment of the device of the invention.

FIG. 2 shows an exemplary implementation of device 10 that can be used in conjunction with the invention. The configuration of device 10 as illustrated in this figure is particularly convenient because it can be applied as an ad-on device to existing strollers without the need to carry out any alterations in the stroller's structure. Device 10 can be connected to a stroller's chassis (e.g., as shown with respect to a stroller 60 in FIG. 7) by any suitable attaching means such as a quick release clamp 6 that can be connected to a chassis 9 of device 10 (or such attaching means can be implemented as an integral part of a casing adapted to accommodate at least part of the components of device 10, such as the electronic unit 5). For example, the quick release clamp 6 can be adjusted once on the first installation of device 10 to the chassis of stroller 60. An exemplary illustration of the quick release clamp 6 is better seen in FIG. 8. Quick release clamp 6 comprises clamps 62 and a quick release lever 63 for locking/unlocking the clamps 62. For example, such quick release clamp can be similar in their clamping operation to many popular products, such as the Little Dude Components (LDC) Quick Release Seat Clamp, XLC QR Alloy Seatpost Clamp, and the like.

The control wheel 3 is an independent (i.e., "free") wheel which is not physically connected to the motion wheel 2, but is connected to the stroller's wheel (that can be the same one the motion wheel 2 is connected to). While the stroller is moving the stroller's wheels are rotating and as a result the control wheel 3 is rotating as well (due the friction between the stroller's wheel and a rotatable portion of control wheel 3). Measuring the rotations of control wheel 3 allows calculating the traveling distance of the stroller—by converting from rotation (angular displacement) to distance (linear displacement). The functionality of measuring the rotations of control wheel 3 can be performed in a variety of ways as known in the art, such as photoelectric mechanism (e.g., similar to the technique used in common computer mouse), magnets, etc.

Figure 3:
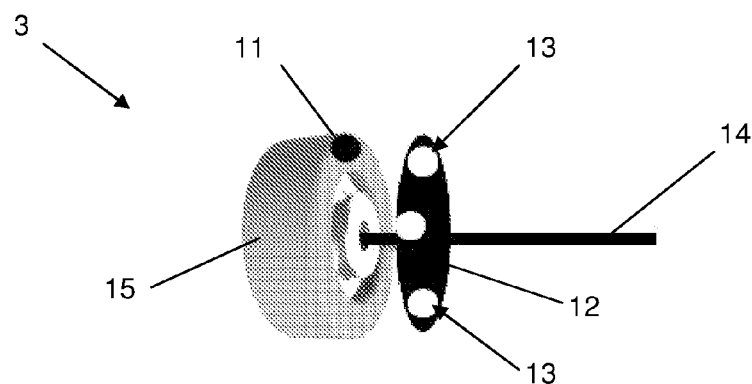
FIG. 3 schematically illustrates the control wheel of the device, according to an embodiment of the invention.

Referring now to FIG. 3, the control wheel 3 is shown in further details in accordance with an embodiment of the present invention. Control wheel 3 comprises a rotatable wheel portion 15 having one or more elements (e.g., a magnet or other element capable of being sensed) that can be sensed by a corresponding sensor and a corresponding sensing unit, e.g., a sensor-board 12.

Control wheel 3 acts as a sensor wheel and is adapted to be physically connected with the wheel of a stroller (this could be either the same stroller's wheel that is driven by the motion wheel 2 or a different stroller's wheel. This of course depends on the structure of the stroller and/or the configuration of device 10). For example, the rotatable wheel portion 15 of control wheel 3 may have a wheel diameter of about 1" to 2.5" and a wheel width of about 0.5" to 1.5", such as the Solarbotics RW2i rubber robot wheel by Pololu Corporation, the foam friction wheel by Active Robots Ltd, etc.

For example, in this embodiment, control wheel 3 is implemented as follows: the wheel portion 15 is provided as a rotatable element that includes at least one magnet 11 located on its surface and the corresponding sensing unit is provided as a fixed portion in form of a circular board (as schematically indicated by the sensor-board 12 in FIG. 3), which includes a plurality of sensors 13 that are deployed in a circular manner on one of its surfaces. According to this example, each sensor 13 can be realized by any type of sensor that is capable of sensing the magnet 11 and accordingly to generate one or more signals, such as a Hall Effect based sensor, e.g., the MH-248 Hall effect sensor by MST (MagneSensor Technology). In order to simply the physical structure of the control wheel 3, sensor-board 12 should have a circular form at about the same diameter as the wheel portion 15. According to some embodiments of the invention, the wheel portion 15 may include a plurality of magnets and the sensor-board 12 will have only a single sensor.

The sensor-board 12 and the wheel portion 15 should be located adjacent to each other in such a manner that the magnets 11 and 13 will face each other. In this embodiment, the wheel portion 15 and the board 12 are coaxially located on the same axle 14. The axle 14 is simply an axle that runs through both the wheel portion 15 and the board 12. The sensor-board 12 and the wheel portion 15 should be located close enough to each other, thus each time the magnet 11 'meets' one of the corresponding sensor 13 (i.e., when the wheel portion 15 rotates due to the movement of the stroller), an electronic signal will be generated. The generated signal is electrically delivered to the electronic unit 5. Due to these generated signals, the electronic unit 5 "knows" the distance that the stroller moves in one direction (e.g., measuring the rotations of the wheel portion 15 is obtained by processing the continuously generated signals (e.g., counting the 'meets'), and accordingly the electronic unit 5 can calculate the traveling distance).

Figure 4:
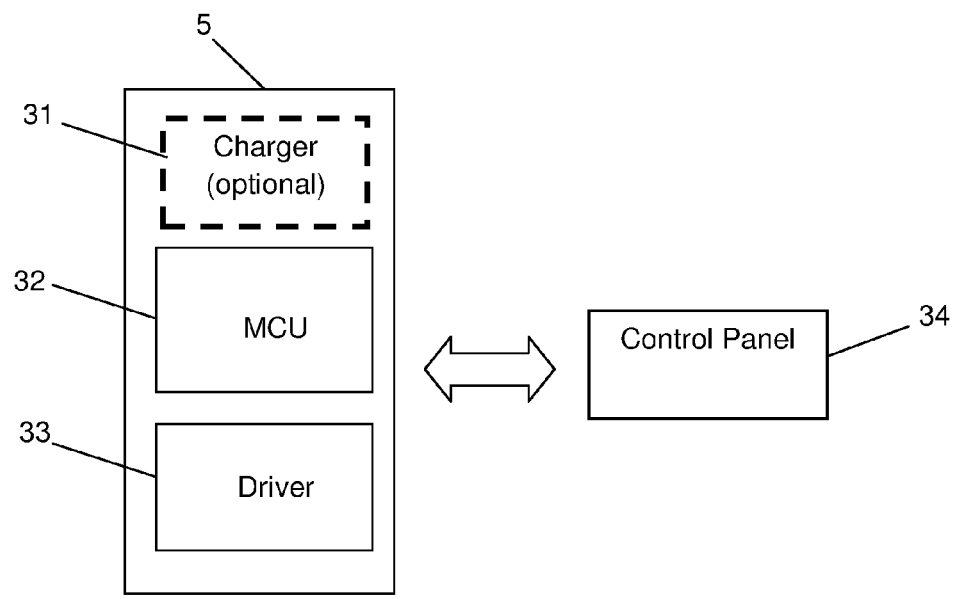
FIG. 4 is a block diagram illustrating an the electronic unit of the device and a corresponding control panel, according to an embodiment of the invention.

Referring now to FIG. 4, a block diagram of the main elements of the electronic unit 5 together with the control panel 34 is shown in accordance with an embodiment of the present invention. The electronic unit 5 comprises a microcontroller unit (MCU) 32, a driver 33 and optionally also a charger 31 for charging a battery 41 of the power source 4 (see FIG. 5 that shows, in a block diagram form, the elements of device 10 including the power source 4 and the mechanical elements such as the motor 1, the motion wheel 2 and the control wheel 3). The electronic unit 5 can be further connected (either in a wired or wireless manner) to a control panel 34.

According to an embodiment of the invention, the user (e.g., the baby's parent) controls the device 10 via the control panel 34. The control panel 34 communicates with the MCU 32. The MCU 32 controls the driver 33. The driver 33 applies the orders/requests from the control panel 34 to the wheel of the stroller via the motor 1 that rotates the motion wheel 2 (see FIG. 5).

Figure 5:
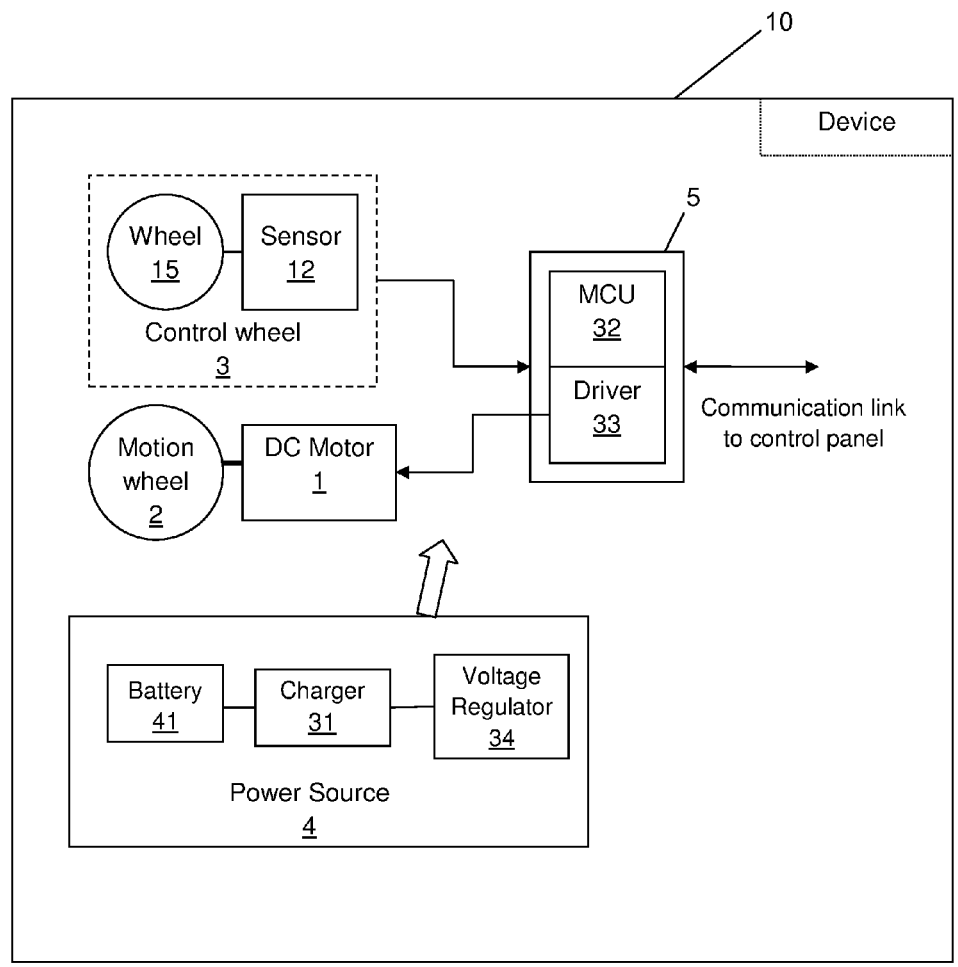
FIG. 5 schematically illustrates a block diagram of the device, according to an embodiment of the invention.

FIG. 5 shows, in a block diagram form, the elements of device 10 including the electrical elements and the mechanical elements, according to an embodiment of the invention. In this embodiment, the power source 4 includes a battery 41 and a corresponding charger 31, and if required also voltage regulator 34. The mechanical elements of device 10 may include the motor 1, the motion wheel 2 and the control wheel 3. In this figure, control wheel 3 is shown with the wheel portion 15 and the sensor board 12 as described hereinabove.

Figure 6:
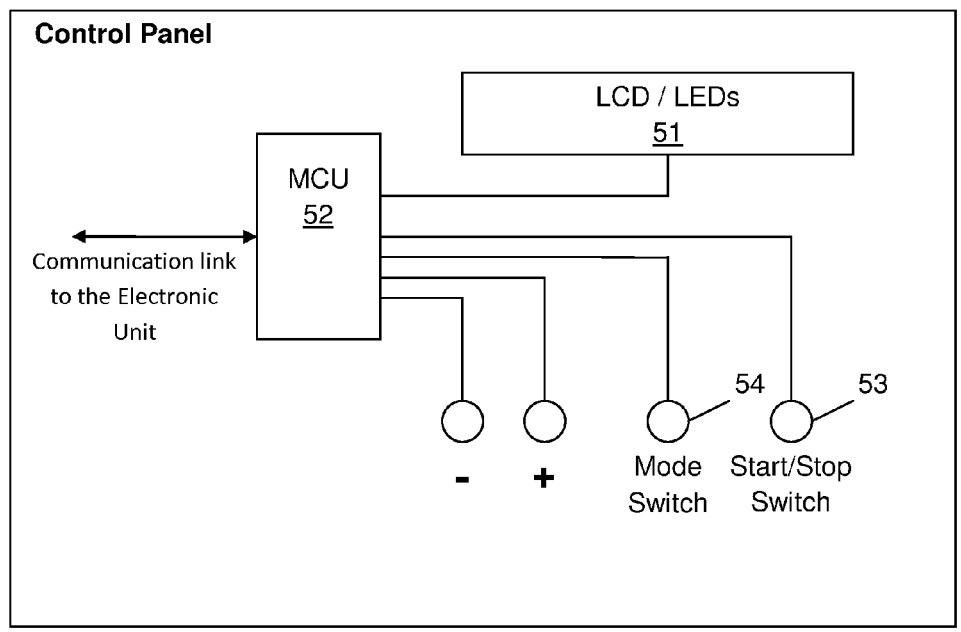
FIG. 6 schematically illustrates a block diagram of the control panel of the device, according to an embodiment of the invention.

FIG. 6 schematically illustrates, in a block diagram form, an exemplary implementation of the control panel 34, according to an embodiment of the present invention. The control panel 34 may include the following functions:

On, Off, Stand By (for range/distance, time settings);
Stroller Range/Distance movement;
Time limit;
Stroller direction movements: forward and backward, vibration.

The control panel 34 can be an electronic module adapted to interact with the electronic unit 5 via any suitable communication channel, either a wired communication link (e.g., a USB cable) or a wireless communication link (e.g., Bluetooth, Zigbee, WiFi). For example, the control panel may include one or more of the following elements (or any combination thereof, as shown with respect to FIG. 6): function keys (e.g., a start/stop switch 53 for starting and stopping the motor, a mode switch 54 for selecting the desired mode for setting such as time, range or speed, setting switches such as decrease ("−") or increase ("+") switches for setting the values of the desired parameters of the switch mode, etc.), a display unit 51 (e.g., LCD panel or a touch-sensitive display), visual indicator(s), one or more LEDs, etc.), audible indicator(s) (e.g., a speaker, or a buzzer), a Micro Controller Unit (MCU) 52 for handling the control panel elements, etc. Alternatively, the control panel 34 can be a smart-phone capable of running a dedicated application for easily interacting with the electronic unit 5 (e.g., via Bluetooth), or it can be any other electronic module capable of controlling and communicating with the electronic unit 5.

Unless otherwise indicated, the functions of the electronic unit 5 as described herein may be performed by executable code and instructions stored in computer readable medium and running on one or more processor-based systems. However, state machines, and/or hardwired electronic circuits can also be utilized. Further, with respect to the example processes described herein, not all the process states need to be reached, nor do the states have to be performed in the illustrated order.

Figure 7:
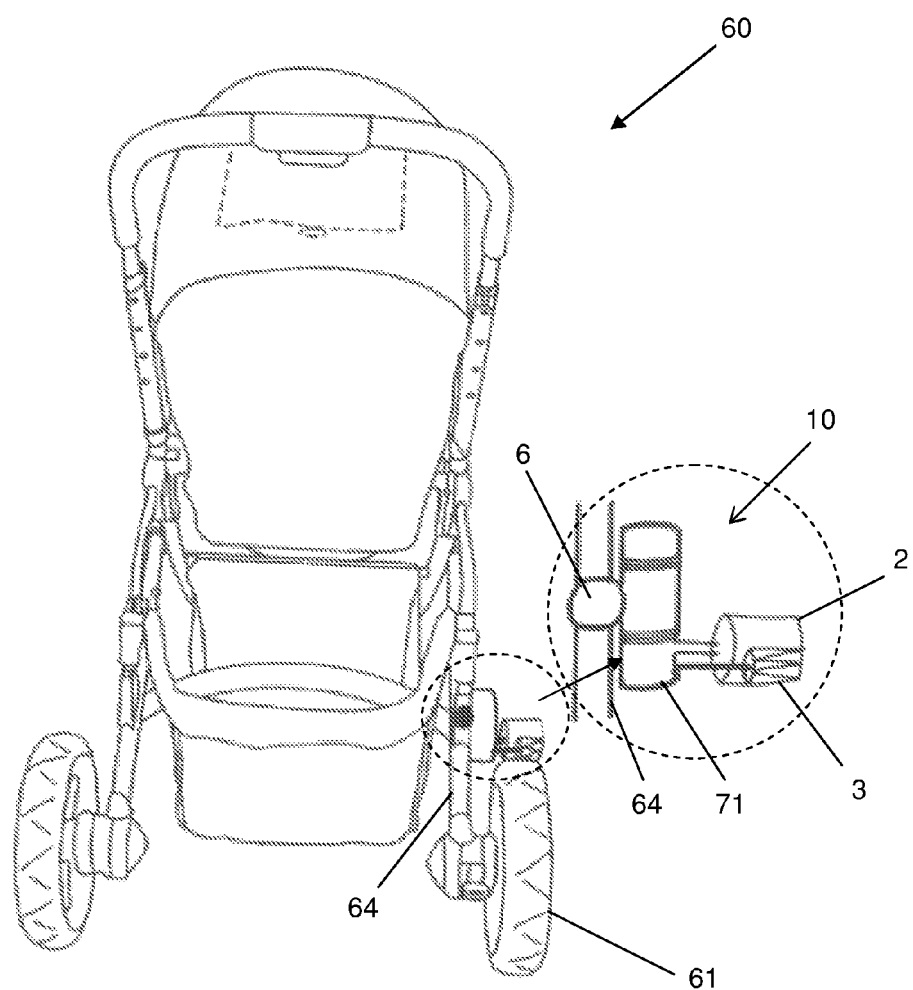
FIG. 7 schematically illustrates the device of the invention attached to a typical stroller, according to an embodiment of the invention.
Figure 8:
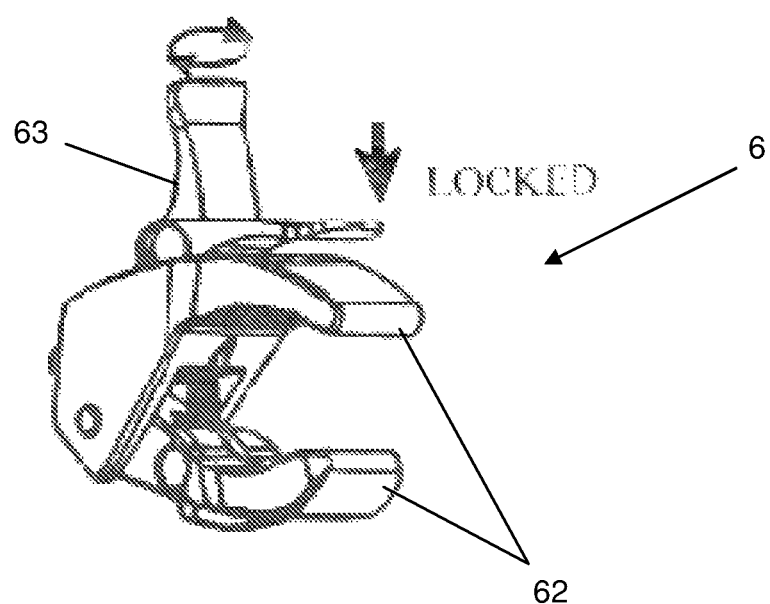
FIG. 8 schematically illustrates a quick release clamp for attaching the device to a stroller's chassis, according to an embodiment of the invention.
Figure 9:
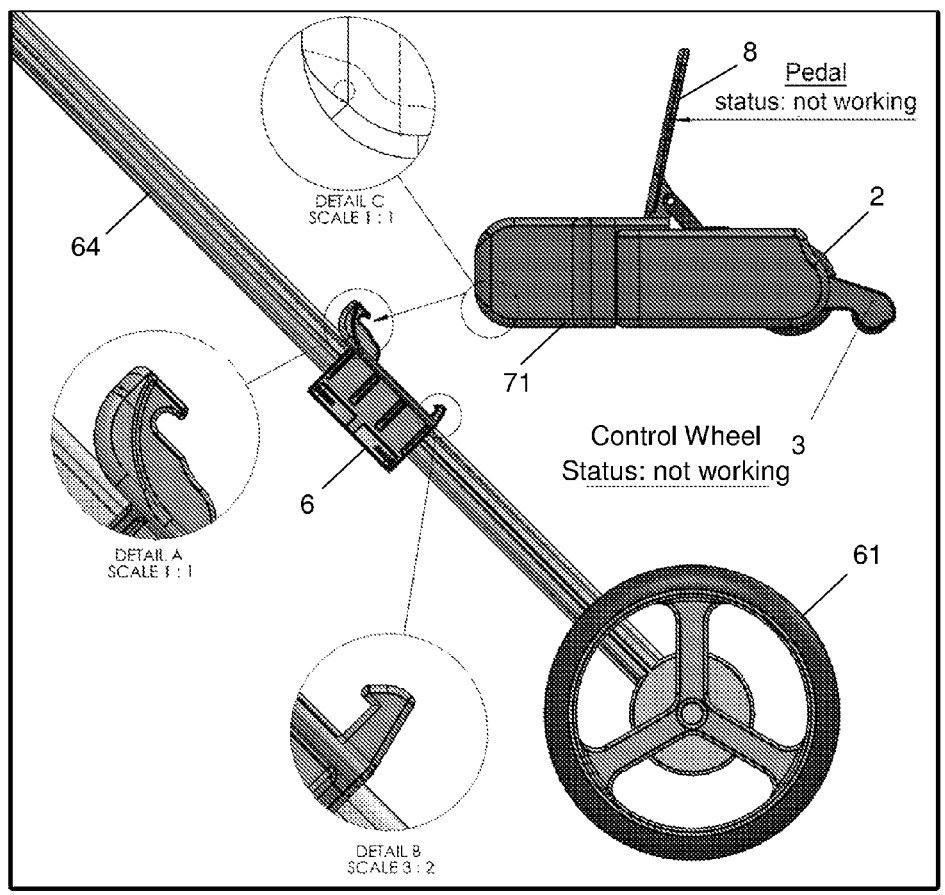
FIGS. 9-12 schematically illustrate a device for automatically rocking a stroller, according to one embodiment of the invention.
Figure 10:
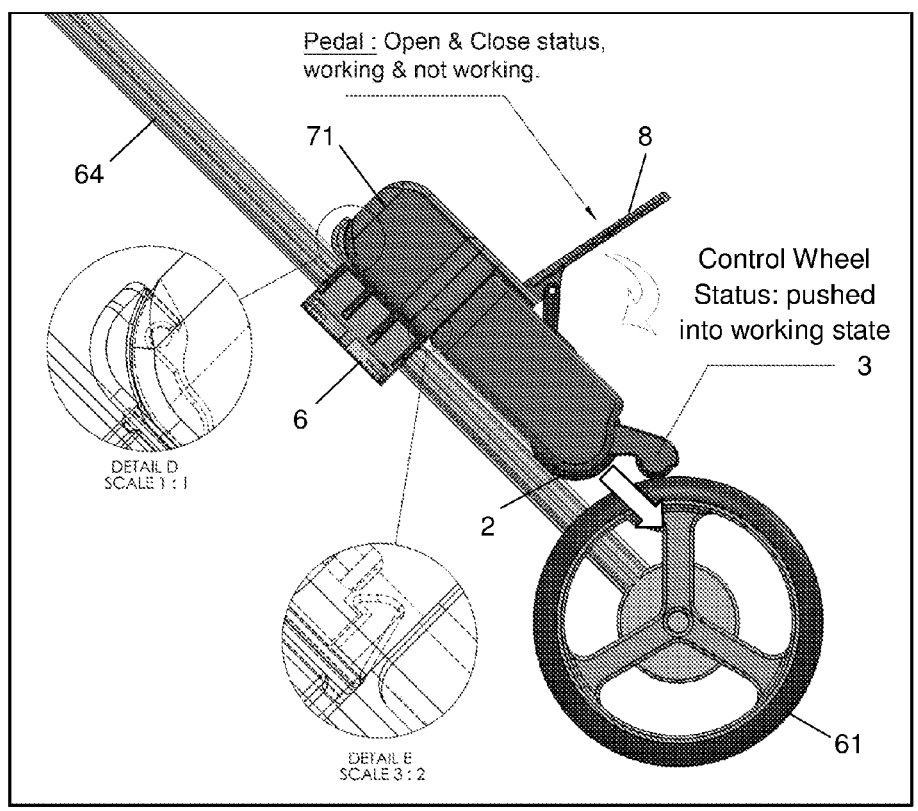

FIG. 7 schematically illustrates the device 10 of the invention attached to a stroller 60, according to an embodiment of the invention. Stroller 60 has a stroller frame member 64 to which device 10 can be attached via the quick release clamp 6.

According to one embodiment of the invention, device 10 includes a casing 71 for covering the electronic unit 5 and to which the quick release clamp 6 can be attached (e.g., on the outer surface of the casing 71).

Stroller 60 typically has three or four stroller wheels 61. It is envisioned by the present invention that the term stroller wheels 61 can also encompass a pair of stroller wheels because some strollers often have a pair of stroller wheels on each of the four corners of the strollers. Often the pair of stroller's wheels has an axle between them. Since device 10 applies equally to collapsible and to non-collapsible strollers, the term stroller wheel 61 refers herein to either a single or plurality of stroller wheels.

Referring now to FIGS. 9-12, an exemplary implementation of a device 10 for automatically rocking a stroller is shown in accordance with one embodiment of the invention. In general, device 10 has two possible states: (i) connected (i.e., working/activated) and (ii) disconnected (working/deactivated). According to an embodiment of the invention, the casing 71 of device 10 may include a pedal mechanism (the pedal of such mechanism is indicated by numeral 8 in the FIGS. 9-12) that allows the user to easily operate activate/deactivate device 10. In the connected working state, the pedal mechanism connects both motion wheel 2 and control wheel 3 with the corresponding stroller's wheel 61 on demand. In this embodiment, changing the position of pedal 8 from upright position into vertical position will push the motion wheel 2 toward the stroller's wheel 61, and at the same time, the control wheel 3 is also pushed and freely connected to the stroller wheel 61.

In this embodiment, when the user changes the position of pedal 8 from upright into vertical, the device 10 will be activated (e.g., to a given time and distance). Of course, device 10 should be attached to the stroller's frame member 64 in such a manner that an appropriate engagement between the control wheel 3 and wheel 61 will occur, as schematically illustrated in FIG. 11.

Figure 11:
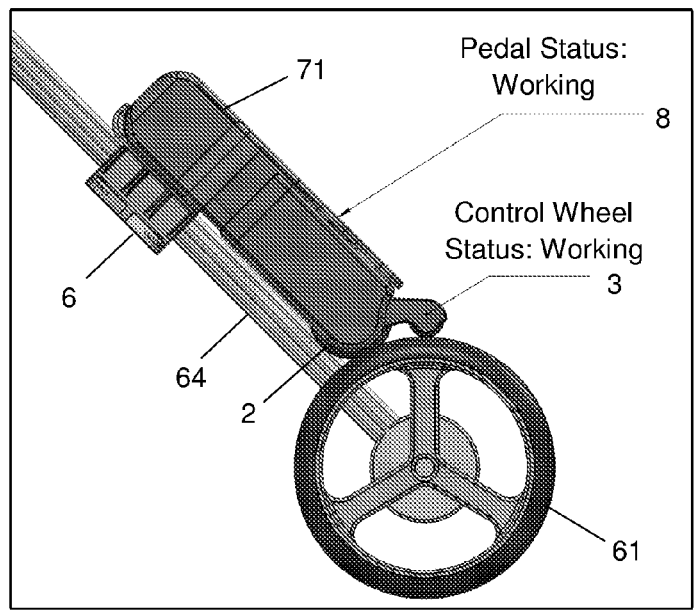
Figure 12:
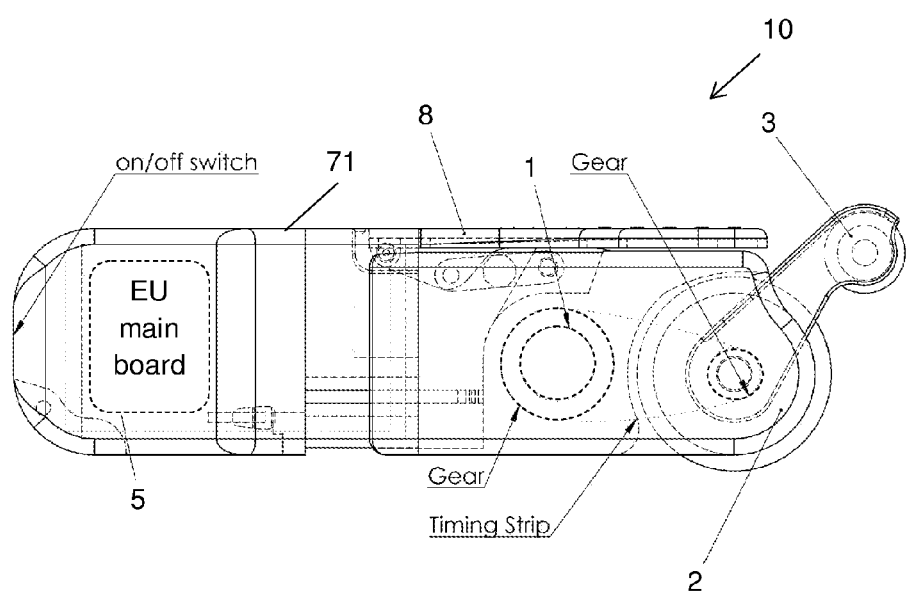

The pedal mechanism deflects/moves the device 10 in such a manner that it will physically connect the motion wheel 2 to the stroller's wheel 61 on demand (e.g., as shown in FIG. 11). In this exemplary configuration, the pedal mechanism physically connects device 10 to the stroller's wheel 61 upon pressing on the pedal 8. In this embodiment, in order to disconnect device 10 from the stroller's wheel 61 (i.e., the deactivated state), the user needs to lift the pedal 8 (e.g., in the reverse direction from vertical position into upright position). As will be appreciated by a person skilled in the art, such a pedal mechanism is similar to the common foot-operating braking mechanism as used by many types of strollers.

Once the device 10 is connected to the wheel 61 of stroller 60 and the motor 1 starts rotating—the motion wheel 2 will move the stroller's wheel 61 (due to the friction between the motion wheel 2 and the stroller's wheel 61).

As will be appreciated by the skilled person the arrangement described in the figures results in an automatic rocking of a stroller. The present invention both contemplates a stand alone device 10 that can be added to any stroller (or other vehicle) as well as a stroller that is manufactured together with such a device 10.

An additional advantage provided by the invention is the accurate measurement of the distance the stroller travels as the control wheel 3 is directly connected to the stroller's wheel.

All the above description and examples have been given for the purpose of illustration and are not intended to limit the invention in any way. Many different mechanisms, methods of analysis, electronic and logical elements can be employed, all without exceeding the scope of the invention.

The invention claimed is:

1. A device for automatically rocking a stroller, comprising: an electronic unit for operating the device by providing commands to move said stroller in one of a forward or backward direction or in both a forward and backward direction; b. a motion wheel adapted to rotate the wheel of the stroller by friction; c. a rotor for rotating said motion wheel according to commands received from said electronic unit; d. a control wheel that includes a wheel portion adapted to be connected directly to the wheel of said stroller and a corresponding sensor board adapted to sense the rotational movement of said wheel portion and accordingly to provide to said electronic unit information regarding the actual rotational movement of said stroller's wheel; and e. a power source for powering said electronic unit.

2. A device according to claim 1, further comprising a control panel for controlling the electronic unit via a communication channel.

3. A device according to claim 2, wherein the communication channel is either a wired communication link or a wireless communication link.

4. A device according to claim 1, in which the electronic unit further includes a charging circuitry for charging the power source.

5. A device according to claim 1, in which the control wheel allows the electronic unit to measure the distance the stroller traveled in each direction, either forward or backward, and accordingly to limit the travelling distance in each of said directions.

6. A device according to claim 1, in which the wheel portion of the control wheel includes at least one magnet, and the sensor board includes one or more corresponding sensors for detecting the direction and distance.

7. A device according to claim 1, further comprising a pedal mechanism that allows a user to easily connect/disconnect the motion wheel and the control wheel with the stroller's wheel on demand.

* * * * *